US012179907B1

(12) United States Patent
Birch et al.

(10) Patent No.: US 12,179,907 B1
(45) Date of Patent: Dec. 31, 2024

(54) ELECTRICALLY DRIVEN BLADE CONTROL FOR ROTORCRAFT

(71) Applicant: Orbital Research Inc., Cleveland, OH (US)

(72) Inventors: Matthew C. Birch, Madison, AL (US); Zak Sowle, Bellbrook, OH (US)

(73) Assignee: Orbital Research Inc., Cleveland, OH (US)

( * ) Notice: Subject to any disclaimer, the term of this patent is extended or adjusted under 35 U.S.C. 154(b) by 239 days.

(21) Appl. No.: 17/861,698

(22) Filed: Jul. 11, 2022

Related U.S. Application Data

(63) Continuation of application No. 16/102,782, filed on Aug. 14, 2018, now Pat. No. 11,414,174, which is a continuation of application No. 13/536,475, filed on Jun. 28, 2012, now Pat. No. 10,077,102, which is a continuation of application No. 12/715,927, filed on Mar. 2, 2010, now Pat. No. 8,235,324.

(60) Provisional application No. 61/157,045, filed on Mar. 3, 2009.

(51) Int. Cl.
| | |
|---|---|
| *B64C 11/30* | (2006.01) |
| *B64C 11/06* | (2006.01) |
| *B64C 27/68* | (2006.01) |

(52) U.S. Cl.
CPC .............. *B64C 11/30* (2013.01); *B64C 11/06* (2013.01); *B64C 27/68* (2013.01)

(58) Field of Classification Search
CPC ....... B64C 11/06; B64C 11/30; B64C 11/301; B64C 11/44; B64C 27/68; B64C 2027/7205; B64C 2027/7216; B64C 2027/7244
See application file for complete search history.

(56) References Cited

U.S. PATENT DOCUMENTS

| | | | | |
|---|---|---|---|---|
| 4,750,862 A | * | 6/1988 | Barnes | .................... B64C 11/30 416/157 R |
| 8,197,205 B2 | * | 6/2012 | Rudley | ................... B64C 27/72 416/158 |
| 8,235,667 B2 | * | 8/2012 | Waide | ..................... B64C 27/68 416/155 |

\* cited by examiner

*Primary Examiner* — Nicholas McFall
(74) *Attorney, Agent, or Firm* — Brian Kolkowski

(57) ABSTRACT

Multiple redundant harmonic drive motors on a rotor head actuate the angle of attack of rotor blades at the rotor blade roots, providing collective control that, in combination with a system for providing cyclic control on the rotor blades, eliminates the need for a swashplate, thereby advantageously reducing the weight and maintenance cost of a helicopter, increasing its reliability, and reducing its vulnerability to ballistic attack.

20 Claims, 13 Drawing Sheets

ELECTRICALLY DRIVEN BLADE CONTROL FOR ROTORCRAFT

CROSS-REFERENCE TO RELATED APPLICATIONS

This application is a continuation of U.S. patent application Ser. No. 16/102,782, which was filed Aug. 14, 2018 and which is a continuation of U.S. patent application Ser. No. 13/536,475, which was filed Jun. 28, 2012 and issued as U.S. Pat. No. 10,077,102 on Sep. 18, 2018, and which is a continuation of U.S. patent application Ser. No. 12/715,927, which was filed Mar. 2, 2010 and issued as U.S. Pat. No. 8,235,324 on Aug. 7, 2012, and which claims priority from U.S. Provisional Patent Application No. 61/157,045, filed Mar. 3, 2009. The specifications and drawings of each of the above patents and applications are herein incorporated by reference in their entirety.

STATEMENT REGARDING FEDERALLY-SPONSORED RESEARCH OR DEVELOPMENT

This invention was made with U.S. Government support under SBIR Phase I contract No. W911W6-09-C-0008 and Phase II contract No. W911W6-09-C-0046 awarded by U.S. Army Research, Development & Engineering Command (RDECOM). The U.S. Government has certain rights in the invention.

BACKGROUND OF THE INVENTION

1. Field of the Invention

The present invention relates to rotorcraft control systems. More specifically, the present invention relates to rotorcraft control systems that are electrically actuated. Even more specifically, the present invention relates to electrically-actuated collective control systems for rotorcraft. The present invention further relates to rotorcraft control systems in which rotor blades are actuated in a manner that obviates the need for a swashplate. The present invention further relates to electro-mechanical torque decoupling mechanisms.

2. Technology Review

Rotorcraft such as helicopters commonly make use of a complex mechanical device known as a "swashplate" to control collective pitch (for providing a change in altitude) and cyclic pitch (for providing change in attitude, and thus maneuvering). By actuating the angles of attack of the rotor blades, each of which is capable of rotating at its root, where it connects to the rotor head, the collective and cyclic pitch of the helicopter can be controlled.

The swashplate, which comprises a non-rotating lower plate movably connected to a rotating upper plate by bearings, is typically located just below the rotor head on the axis of the main rotor shaft, and is itself typically actuated by hydraulic cylinders mounted to the chassis. When rotorcraft controls actuate the hydraulic cylinders, the hydraulic cylinders move and pitch the non-rotating lower plate up and down and at an angle with respect to the plane of the main rotor. This up-and-down movement and/or pitch is transferred to the rotating half of the swashplate. The rotating half of the swashplate thereby transmits the motion of the stationary actuators to the several rotating pitch links, which connect the upper plate of the swashplate to the blade roots and act as lever arms, increasing or decreasing the blades' angle of attack.

A swashplate, however, disadvantageously adds weight and aerodynamic drag to a rotorcraft, which can in turn reduce power, speed, maneuverability, and increase cost of flight. Another major disadvantage of a swashplate is that it limits control inputs to one per revolution of the rotor blades (except in the case of a three-bladed rotor). In addition, because of its mechanical complexity and the fact that it provides a single point of critical failure, swashplates necessitate many hours of inspection and preventative maintenance. The pitch links of a swashplate, which occupy a relatively large volume on the upper side of a rotor shaft and are therefore difficult to shield, also introduce significant ballistic vulnerability, as from missile attack, flak, and other flying debris. Damage to any one of the pitch links results in a loss of rotorcraft control.

What is needed is a system that would eliminate the need for a swashplate to provide robust collective control while still providing root control of rotor blades for cyclic control. What is also needed is a system with a service life similar to a swashplate system without the swashplate's limitations. What is also needed is a system that could realize the considerable performance increases possible if control inputs could be made at a frequency higher than once per revolution. What is also needed is a control system with lower weight and reduced fuel usage, better aerodynamics, reduced ballistic vulnerability, reduced costs, improved reliability and/or the like. Having lower weight and thus reduced fuel usage reduces the carbon footprint of the rotorcraft. It is an object of the present invention to provide a system with one or more of these advantages over traditional swashplate rotorcraft.

U.S. Patent Application Publication 2009/0269199 A1 to Rudley et al. describes a system that provides individual control of rotorcraft blades at the blade root by means of electric motors powered by electric generators that in effect siphon the electrical power needed to rotate the blades off the motion main rotor shaft. Some redundancy is provided both in the generators and the motors. However, the system of Rudley et al. requires multiple rotating-frame motors per blade, giving the system a high weight, and contains no provision for decoupling damaged or inoperable motors from the system during operation, meaning that remaining operable motors must work against the resistance of inoperable motors, an impossibility if the inoperable motors have seized due to damage or wear. Furthermore, in the system of Rudley et al., adverse combinations of generator and motor failure may result in catastrophic total system failure, which may lead to loss of life, even if a majority of generators and motors are operable. Moreover, the system of Rudley et al. requires at least as many functional motors as blades for the continued operation of the system. Additionally, the system of Rudley has inherent backlash throughout the system due to the types of gears and parts needed for the individual blade control system. Further, the system of Rudley requires elaborate effort to maintain or upgrade the system as the numerous blade actuation motors surround the blade roots and connect to them in multiple places, rather than being packaged as easily-replaceable modular units that could be swapped out with a minimal number of system disconnects.

What is needed is a system capable of providing collective control with fewer total electric motors to reduce the amount of weight both of the overall rotorcraft and especially in the rotating frame of the rotor hub. What is also needed is a system capable of providing robust collective control under battle conditions where combat damage may result in reduced operability or failure of critical system components, and where such components may need to be disconnected from the overall system. What is also needed is a collective control system that balances redundancy of critical system components with weight considerations. What is also needed is a system capable of providing power to on-blade actuation systems without requiring heavy and failure-prone power generators in the rotating frame. What is also needed is a system capable of operating with fewer functional motors than blades. What is also needed is a system that reduces or eliminates backlash throughout the system to provide rotorcraft controls of rapid and reliable responsiveness. What is also needed is a system that packages the actuation systems as line replaceable units (LRUs) to reduce system manufacturing and maintenance costs. It is an object of the present invention to provide a system with one or more of these advantages over the system of Rudley et al.

To achieve swashplateless primary flight control in helicopters, on-blade control is required both to provide cyclic control for maneuvering and to ameliorate high levels of vibration and noise. High levels of vibration in rotorcraft cause various problems, including structural fatigue, pilot fatigue, reduced rotorcraft readiness, and increased costs of development and maintenance. Current helicopters typically employ passive vibration isolation and absorption to reduce fuselage vibration. However, these passive devices are heavy and have various other limitations. Past attempts to further reduce vibration have used active techniques such as higher harmonic control of the swashplate and individual blade control by means of active pitch links at the root of each blade.

What is needed, therefore, is a system capable of collective control which can be combined with systems for providing on-blade control. The present invention accommodates on-blade control to provide a comprehensive, cost effective, robust solution to improve rotorcraft performance.

SUMMARY OF THE INVENTION

The present invention relates to rotorcraft control systems. More specifically, the present invention relates to rotorcraft control systems that are electrically actuated, and even more specifically to electrically actuated, collective control systems. The present invention further relates to rotorcraft control systems in which rotor blades are actuated in a manner that obviates the need for a swashplate.

The present invention relates to rotorcraft, including all types of helicopters, unmanned aerial vehicles (UAVs), tiltrotors, quad-tiltrotors (QTRs), and the like. The rotorcraft may in some cases be swashplateless.

The present invention preferably uses electric actuators to drive a single mechanism capable of increasing the root blade incidence while maintaining integrated mechanical and electrical pathways for access to on-blade control systems and devices. Preferably, the electric actuators are electric motors (and transmissions) and more preferably comprise harmonic drive transmissions. The present invention advantageously reduces rotorcraft complexity, weight, and drag, as well as decreases the ballistic vulnerability associated with swashplate pitch links.

In rotorcraft having swashplates, blade actuation comes from a hydraulic, mechanical actuator positioned below each blade in the hub, while in the present invention each actuator is preferably mounted on the rotor head at approximately the same level as the blades, and preferably closer to the center of rotation. A unifying mechanical linkage interconnects rotor blades and the output shafts of the electrically-driven actuators by which the actuation force applied to the system, producing coordinated motion of all blades in a collective manner. Preferably, at least two electrically-driven actuators input on this interconnection mechanism, advantageously providing redundancy into the collective design. Failed electrically-driven actuators preferably disengage from the collective mechanism, and the control system continues to operate with preferably no diminished control but may also operated with a diminished but capable performance. Consequently, a level of safety can be selected to ensure a minimum required actuation capability with the maximum number of failed actuators. The level of redundancy and performance loss may thus be adjusted as design parameters by determining the number of electric motors and harmonic drive transmissions. Preferably, the wear tolerance of the rotor head components has a lifetime commensurate with or longer than other major components.

A compact collective control system that does not use a swashplate can be completely mounted inside the hub of the rotor, eliminating the drag associated with the swashplate and pitch links. This collective control system arrangement also allows the rotor hub to be more aerodynamic, reducing drag both on the rotor's rotation and the craft in general. Advantageously, the swashplateless collective system of the present invention need not use hydraulics. Instead, electric actuators give reliable collective actuation and offer the simplified control of an electric motor. Eliminating hydraulic actuation reduces the complexity of transmitting hydraulic power from the fuselage to the rotating components, eliminates the vulnerability of non-redundant hydraulic components, and increases reliability and maintainability by reducing failures and maintenance associated with hydraulic leakage.

By reducing the weight of the rotorcraft, by reducing or eliminating the need for the hydraulics components, and by improving the aerodynamics as described above, the rotorcraft uses less fuel, saving operating and logistical supply costs. This also reduces the carbon footprint of the rotorcraft making it more environmentally acceptable. Elimination of the swashplate may also have other advantages, such as improving the stealth capabilities of the rotorcraft or reducing certain types of noise.

The harmonic drive transmission and motor-actuated collective rotor head of the present invention uses a control system to drive the mechanism as prescribed by input controls. This control system ensures the system behaves predictably and is stable over the entire flight envelope of the particular rotorcraft.

In some preferred embodiments of the present invention, the electric actuators are powered by a shaft-mounted power generation system. In such embodiments, the stator of the generator may be mounted to the stationary part of the mechanical transmission and the rotor of the generator to the shaft. Thus, power generation is made integral to the rotor shaft, reducing the complexity of transmitting power through the rotating interface. In the event main turbine or auxiliary power is lost, power will be generated for control actuation as long as the rotor is rotating. Thus, control is provided during autorotation in the event of an unpowered landing. In other embodiments, the electric actuators draw power from power lines run up a hollow rotor shaft that transmit electric power by means of brushes or brushless slip rings or similar non-mechanically-linked electrical connection(s) at the bottom or lower part of the rotor shaft.

Preferably, the electrically-driven actuators are redundant for increased system reliability. Preferably, the actuators drive a single robust element that adjusts the blade root incidence angle of all blades while providing integral access to the root of each blade.

Preferably, the actuators comprise transmissions with a minimal amount of backlash, even after thousands of hours of operational wear on the transmissions. The actuators and linkages preferably comprise low backlash transmissions and linkages. Backlash is the maximum angle range of motion that can be applied to the output of a transmission with no corresponding motion of the transmission's input and no reaction torque observed on the output. Any definition for backlash which states that some backlash must be allowed to prevent jamming is formulated for transmissions such as spur gears and does not apply to zero-backlash transmissions. Preferably, the actuators' transmissions and linkages have an amount of backlash that is less than 0.5% of the total angular displacement range of the rotorcraft blades. More preferably, the actuators' transmissions and linkages have an amount of backlash that is less than 0.3% of the total displacement range of the blades. Even more preferably, the actuators' transmissions and linkages have an amount of backlash that is less than 0.2% of the total displacement range of the blades. More preferably still, the actuators' transmissions and linkages have an amount of backlash that is less than 0.1% of the total displacement range of the blades. Most preferably, the actuators' transmissions and linkages have zero backlash.

Preferably, the actuators comprise single-stage transmissions. A transmission is single-stage when it has only a single gear reduction, that is, when it comprises the fewest number of mechanical components that still result in a realizable gear ratio. A cycloid drive, for example, is a single-stage transmission because the first half of a cycloid drive cannot realize a gear ratio.

Preferably, the actuators are harmonic drive motors, that is, motors which include harmonic drive transmissions. Advantages of harmonic drive motors include (1) no backlash, (2) high torque output, (3) high holding torque with low power and (4) simple position control. Embodiments using harmonic drives offer a lightweight servomotor-like control without the weight or backlash problems of traditional spur or planetary drive systems, as well as a lighter weight, more compact system compared to traditional servo systems with similar gear ratios and torque outputs.

The harmonic drive motor of the present invention preferably comprises a brushless servo motor coupled to a harmonic drive transmission, which generally comprises a rigid, internally toothed circular spline (CS), an externally toothed nonrigid flexspline (FS) with fewer teeth than the circular spline, and an elliptical cam enclosed in an antifriction ball bearing assembly called a wave generator (WG), which is inserted into the bore of the flexspline.

Brushless servo motors can advantageously run for long durations with little or no preventive maintenance required, and have excellent control characteristics. They are easy to control, have the capacity for high torque and high bandwidth application, and are a mature and commercially available technology.

The harmonic drive transmission preferably provides a very compact single stage transmission capable of high gear ratios. The unique way the teeth of the single stage mesh results in a transmission with no backlash. This is critical in a collective application where pitch angle must be changed rapidly. The lack of backlash in the harmonic transmission means that direction changes of the blades can be quick and precise without additional systems or parts to compensate for the backlash of traditional transmissions. The harmonic drive transmission also has roughly 30% of its teeth engaged at any one point. This results in a very strong and torsionally stiff transmission, aiding fast and accurate control of the rotor blade pitch angle. Harmonic drive transmissions are also low maintenance devices, as the unique way the teeth of the circular spline and the flexspline mesh results in very low tooth wear, as the torque is distributed across about 30% of the teeth at all times. The bearing in the wave generator has comparable wear to other roller bearings, which results in long life and straightforward maintenance.

Preferred embodiments of the present invention utilize multiple electrical actuators, all driving a single robust linkage element. The invention thus takes advantage of off-the-shelf electrical actuators as readily available, "plug-and-play" components to fulfill torque and speed requirements, while enabling adjustable levels of redundancy. Actuators based on electric motors and/or mechanical transmissions may degrade or fail for a number of reasons. In a combat situation, a piece of shrapnel or a weapon projectile such as a bullet may penetrate the motor housing, destroying the motor, or that of its transmission, causing the actuator to seize, or the actuator may be crumpled or deformed, or its axis of torque transmission taken out of alignment. Electrical shorts in the windings of a motor may cause the motor to produce reduced torque or to fail completely, leaving it an open system component which may add some degree of mechanical resistance to the system. Gear failure of an actuator's transmission may occur from damage or wear, and fatigue failure of spur gears or a planetary transmission, such as a broken or deformed gear tooth, may result in lock-up. Bearing failures or axle failures may make teeth go out of mesh. If several teeth break off, this may add an intolerable amount of backlash to the system. The system envisioned in the present invention which utilizes multiple redundancy and harmonic drive transmissions addresses these failure modes to improve the reliability of the functioning of the collective control system. Preferably, the system of the present invention accommodates the gamut of actuator operability states through a combination of electronic control and mechanical decoupling. For example, an actuator that has experienced a mild failure resulting in only a reduced output capability may be accommodated to permit continued but lessened contribution to the collective control system via an algorithmic control, whereas an actuator which has failed to the point of lock-up, or to the point that its resistance to the system is undesired or intolerable, may be physically decoupled from the system by the means described below.

Preferably, the present invention will utilize a material system such as a hardened tool steel and/or will use intensively quenched steel-based parts as the main material for the load-bearing components such as gears, transmission, linkage elements, axles, bearings, mounting mechanisms or any other structural component. Through proper material selection, these and other components will be more likely to survive the high loads in the rotor head which will hinder these and other failure modes described.

Providing internal access to the root of each blade is critical to enable on-blade controls for cyclic control.

The resulting reduction in volume of the swashplateless collective system adds an additional measure of ballistic damage resistance of the rotor hub.

In several embodiments, the present invention is a helicopter comprising a chassis and a rotor, the rotor comprising a rotor head; at least two blades mounted to the rotor head, each blade having a blade root; at least one electrically-driven actuator adapted to rotate along with the rotor head for adjusting the angle of attack of at least one of the at least two rotor blades by rotating the blade at the blade root. In several embodiments, the helicopter does not have a swashplate. Preferably, the at least one electrically-driven actuator comprises a single-stage, zero-backlash transmission. Preferably, the at least one electrically-driven actuator is a harmonic drive motor. Preferably, at least two electrically-driven actuators are adapted to rotate along with the rotor head for adjusting the angle of attack of all of the at least two rotor blades. Preferably, each of the at least two electrically-driven actuators is equipped to be mechanically decoupled from the rotor in the event that the actuator becomes disabled. Preferably, fewer than all of the at least two electrically-driven actuators are capable of adjusting the angle of attack of all of the at least two rotor blades.

The present invention also provides several novel electromechanical torque decoupling mechanisms.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

FIG. 10a. Perspective view of a second embodiment of the decoupling mechanism in full engagement, similar to FIG. 9a.

DETAILED DESCRIPTION OF THE INVENTION

Figure 1:
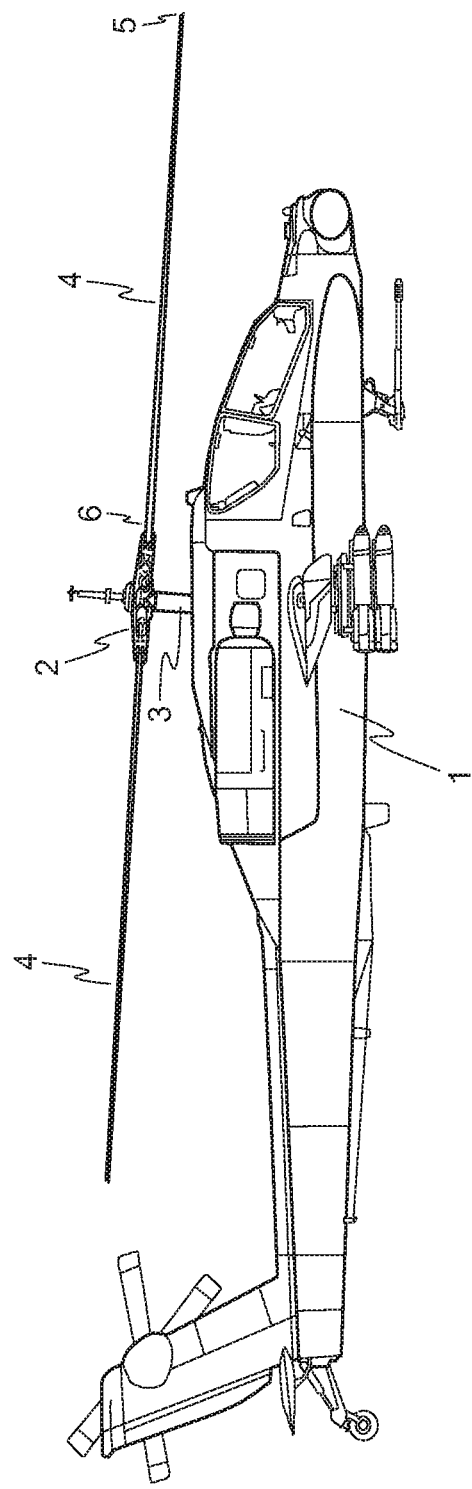
FIG. 1. Schematic view of a helicopter with electrically driven blade control.

FIG. 1 illustrates an AH-64 Apache helicopter 1 modified to have electrically driven main rotor collective blade control. The illustrated helicopter is chosen as representative of any rotorcraft that could benefit from elimination of the swashplate, and while the designs illustrated in the figures that follow similarly are tailored to the AH-64 rotor hub specification, the invention described is intended to encompass all rotorcraft. In FIG. 1, the helicopter comprises a chassis 1 and a rotor head 2 mounted to main rotor shaft 3. Rotor blades 4, each of which has a blade tip 5 and a blade root 6, are attached to the rotor head 2 at the blade root 6. In rotorcraft having a swashplate, the swashplate (not shown) would rotatably couple the chassis 1 to the blade roots 6 and would appear on the main rotor shaft 3 at roughly the location indicated in the drawing by lead line 3 of FIG. 1. In some rotorcraft, the blade root 6 may be considered part of the rotor head 2 or part of the rotor blade 4 or some combination of the two where they interface; the distinction is not critical for this invention, other than to point out that the invention is advantageously capable of actuating the blades' angles of attack at the blade roots rather than on the blade or at the blade tip, while still facilitating access to the blades for providing on-blade control.

The invention provides collective control for all blades. In a electrically-driven collective blade control rotorcraft, cyclic control could be transferred to an on-blade control mechanism, systems which include but are not limited to blade flaps placed on the trailing edges or blade tips, torsionally deformable blades or blade segments that use active materials to twist the blades into new configurations, adjustable camber airfoils, electro-hydraulic actuators, microelectromechanical systems (MEMS) for affecting airflow over the blades, or plasma systems. Mechanical or MEMS systems for actuating flow can be similar to those disclosed in U.S. Pat. Nos. 7,070,114 and 7,226,015, which are incorporated by reference herein.

Figure 2A:
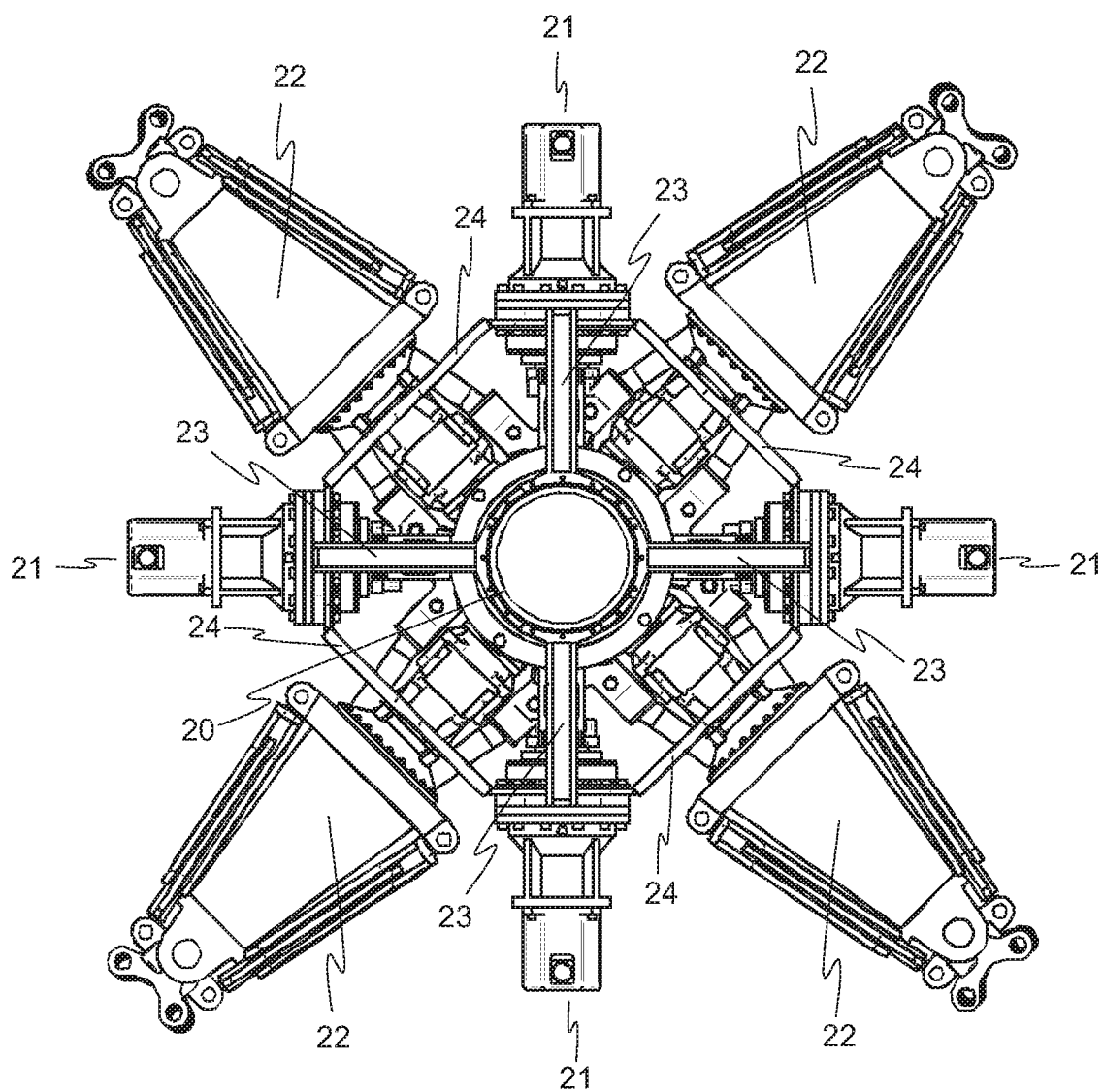
FIG. 2a. Plan view of electrically driven blade control helicopter rotor head equipped with an electrical rotor blade actuation system.
Figure 2B:
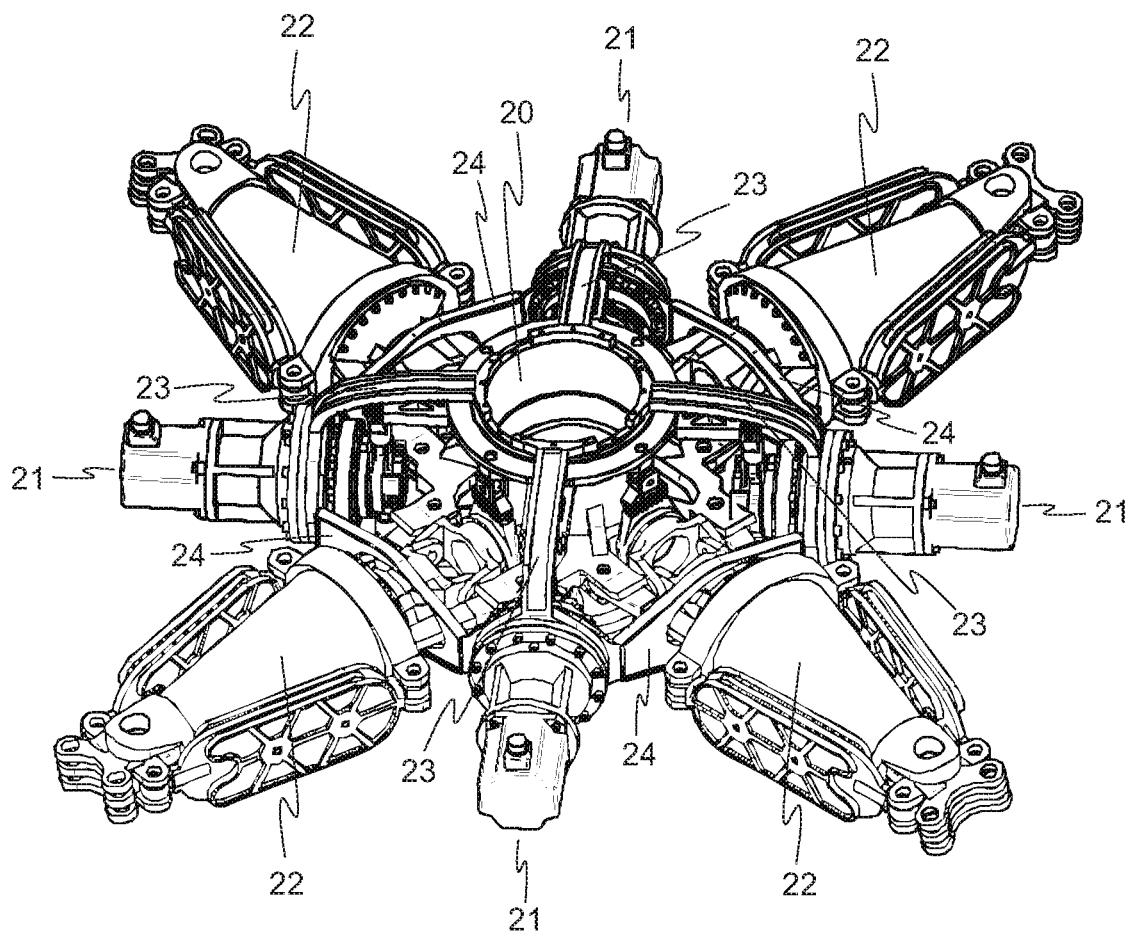
FIG. 2b. Isometric view of electrically driven blade control helicopter rotor head equipped with an electrical rotor blade actuation system.

FIG. 2a and FIG. 2b show the same rotor head 2 from different views. FIG. 2a illustrates plan view of the rotor head 2, looking down the axis of the rotor shaft (not shown in FIG. 2a and FIG. 2b), while FIG. 2b illustrates an isometric view. In this particular embodiment, four electrically-driven actuators 21 protrude from the hub 20 of the rotor head and are immovably connected to the rotor head from the top and bottom by arcing linkages 23, as well as to each other on the sides by aperture linkages 24 through which the blade roots 22 protrude without interfering with the linkages. The illustrated embodiment shows four electric actuators 21, but there could conceivably be any number. This system can be designed to work with a single electric actuator 21. Preferably, there are at least two electric actuators 21, so as to provide redundancy. More preferably, there are at least three electric actuators 21. Most preferably, there are at least four electric actuators 21. The number of electric actuators preferably is also dependent on the number of rotor blades.

Preferably, the actuators 21 are spaced equidistant from each other around the rotor head 2, so as to provide rotational balance of the rotor head as the rotor spins. In preferred embodiments, the electric actuators are harmonic drive motors, i.e., motors that include harmonic drive transmissions. The illustrated embodiment shows four blade roots 22, but there could conceivably be any number, two or greater.

As the rotor head 2 spins, the electrically-driven actuators 21 hide in the wake of the pitch housings 31.

Figure 3A:
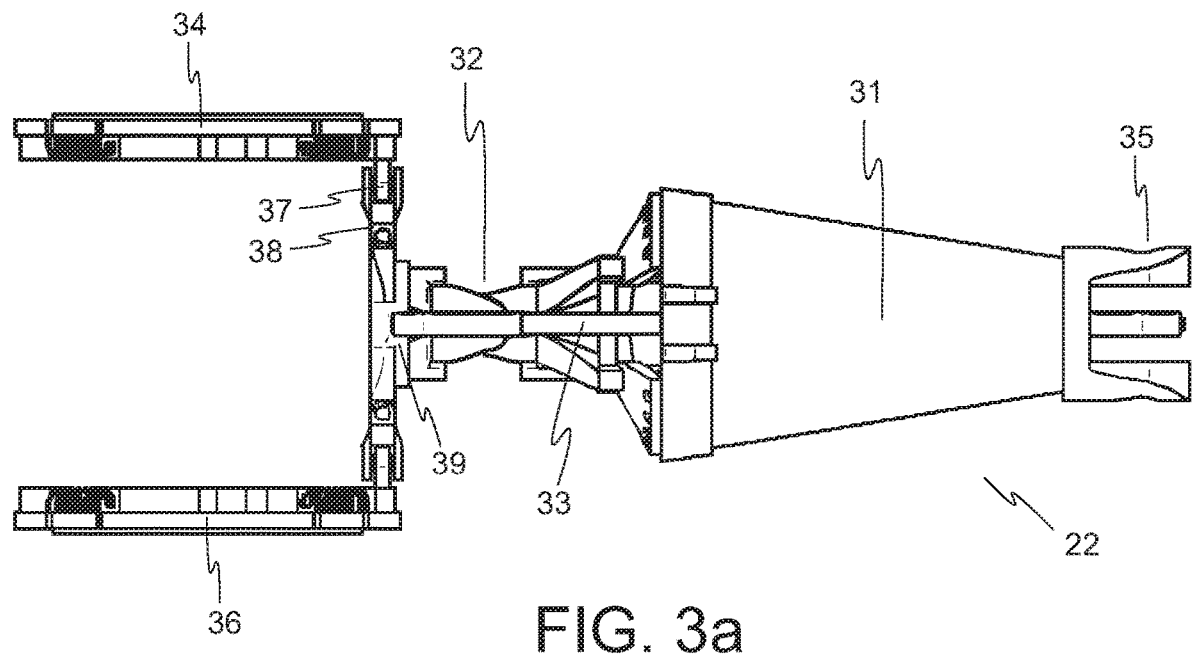
FIG. 3a. Plan view of a single blade root.
Figure 4A:
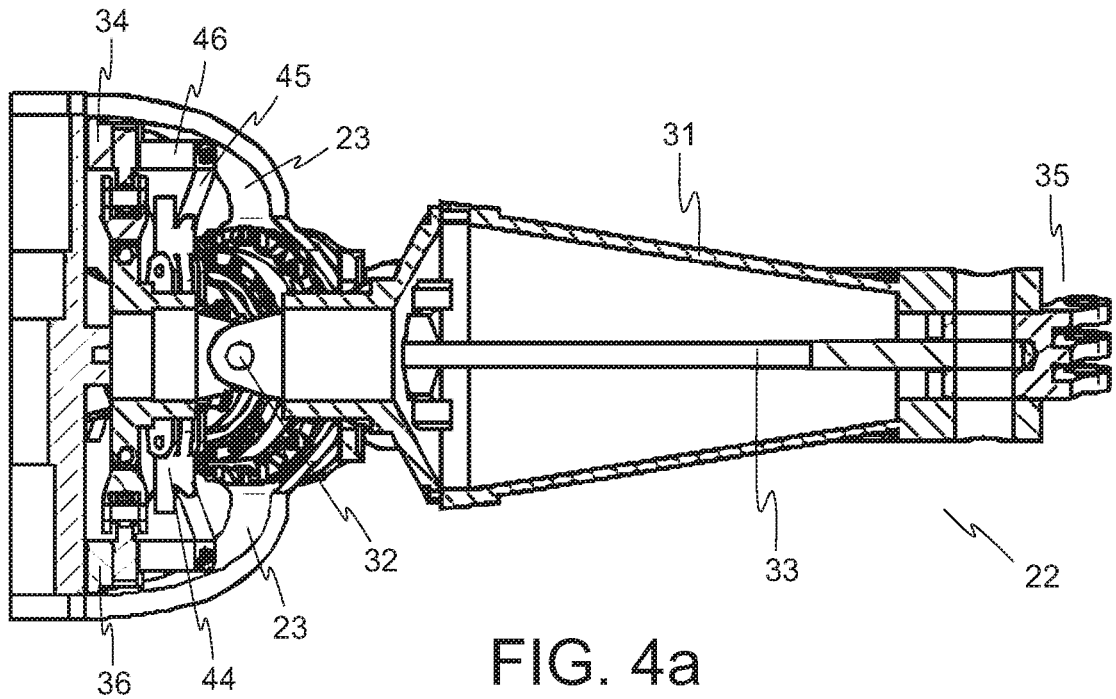
FIG. 4a. Cross-sectional view of a single blade root.

FIG. 3a and FIG. 4a illustrate individual blade roots 22, FIG. 3a from an exterior component view and FIG. 4a from a cutaway system view. The rotor blade (not shown) attaches at lead-lag link 35. The flapping hinge 32 alleviates rotor head rigidity, permitting equalization of lift forces during forward flight. The strap pack 33 provides the load-bearing attachment between the blade root and the rotor hub 20. The pitch housing 31 surrounds and protects the strap pack 33.

Figure 3B:
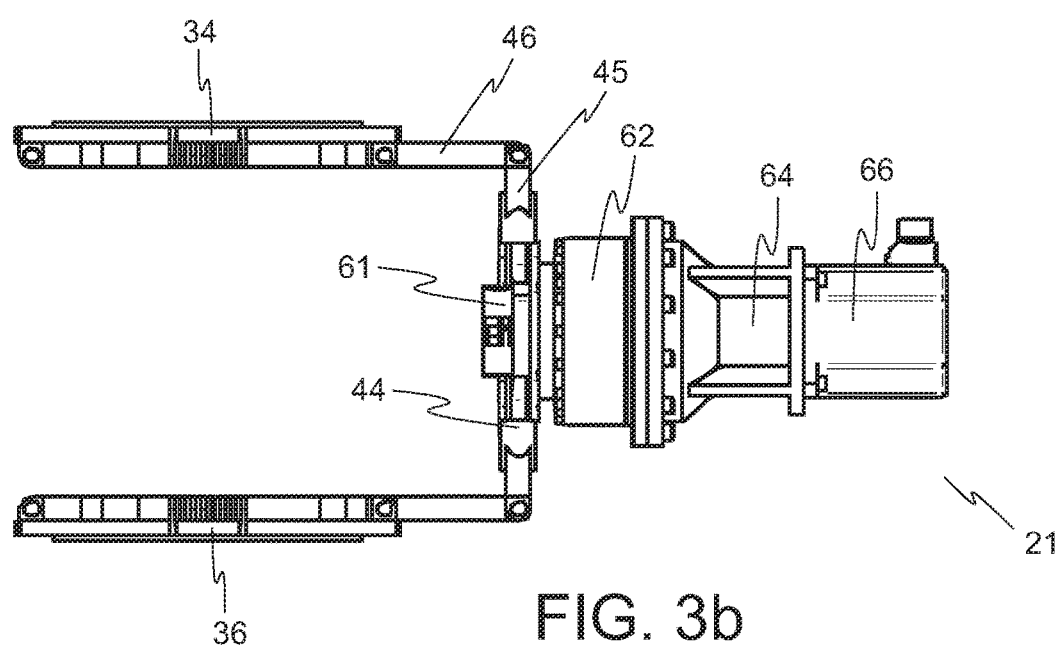
FIG. 3b. Plan view of a single actuator line replaceable unit (LRU).
Figure 4B:
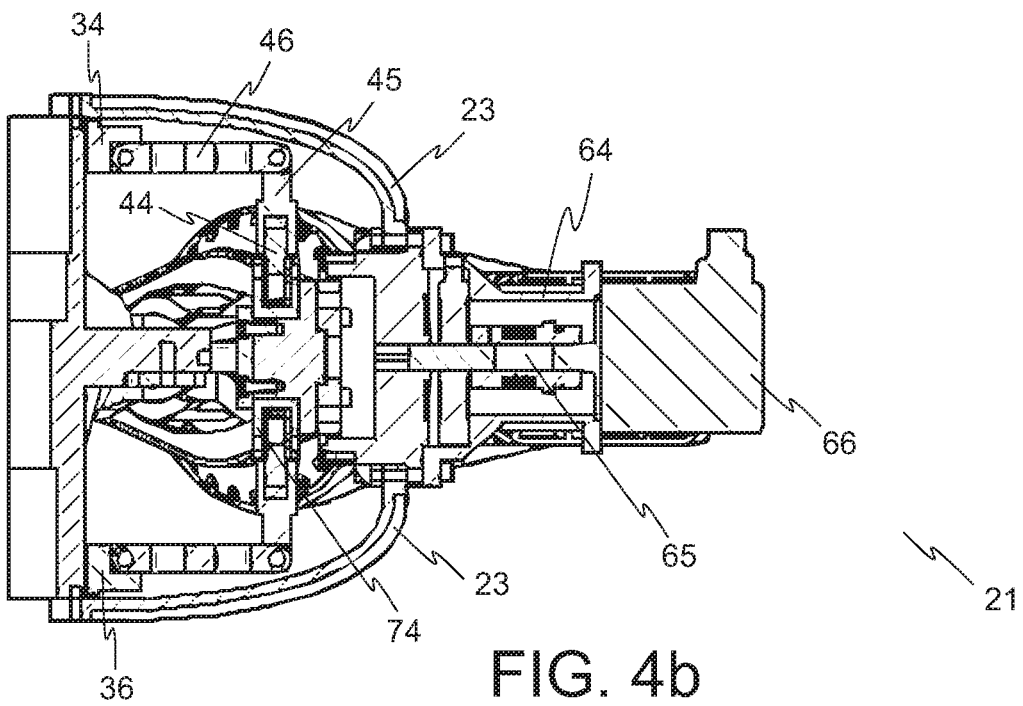
FIG. 4b. Cross-sectional view of a single actuator line replaceable unit (LRU).
Figure 5:
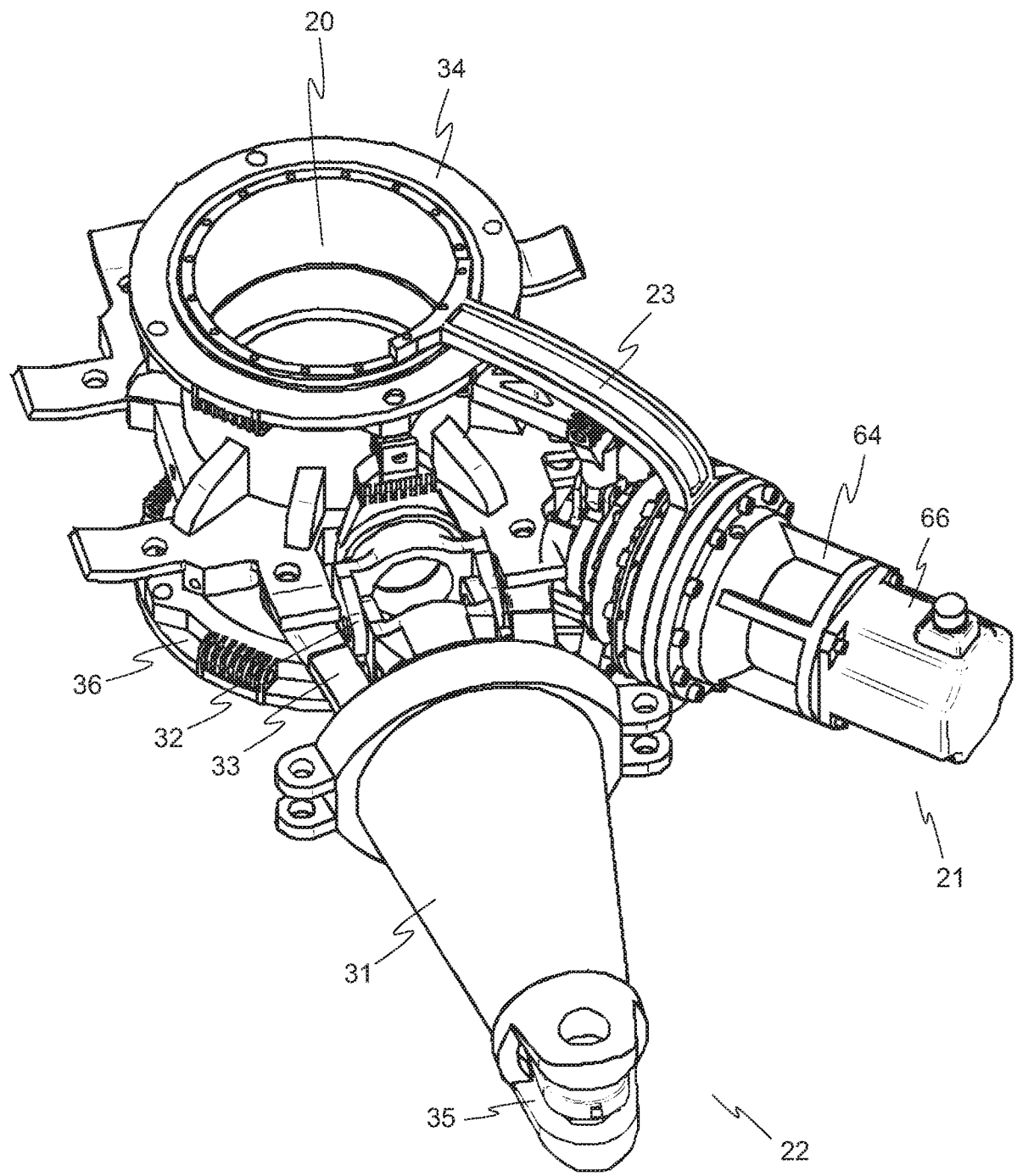
FIG. 5. Perspective view of a single blade root and a single actuator line replaceable unit (LRU) in combination with the rotor head.

FIG. 3b and FIG. 4b illustrate individual electrically-driven actuators 21, FIG. 3b from an exterior component view and FIG. 4b from a cutaway system view. These drawings, in conjunction with FIG. 5, which shows rotor head 2 with all but one blade root 22 and one electrically driven actuator 21 removed, and FIG. 6, which shows electrically-driven actuator 21, assist in describing the exact working of the invention in its illustrated embodiment. In various embodiments, the word "transmission" as used below may refer to the several elements that step down rotation provided from an electric servo motor 66. In the illustrated embodiment, the transmission comprises harmonic drive 62, but may comprise different or additional elements depending on the embodiment.

Figure 6:
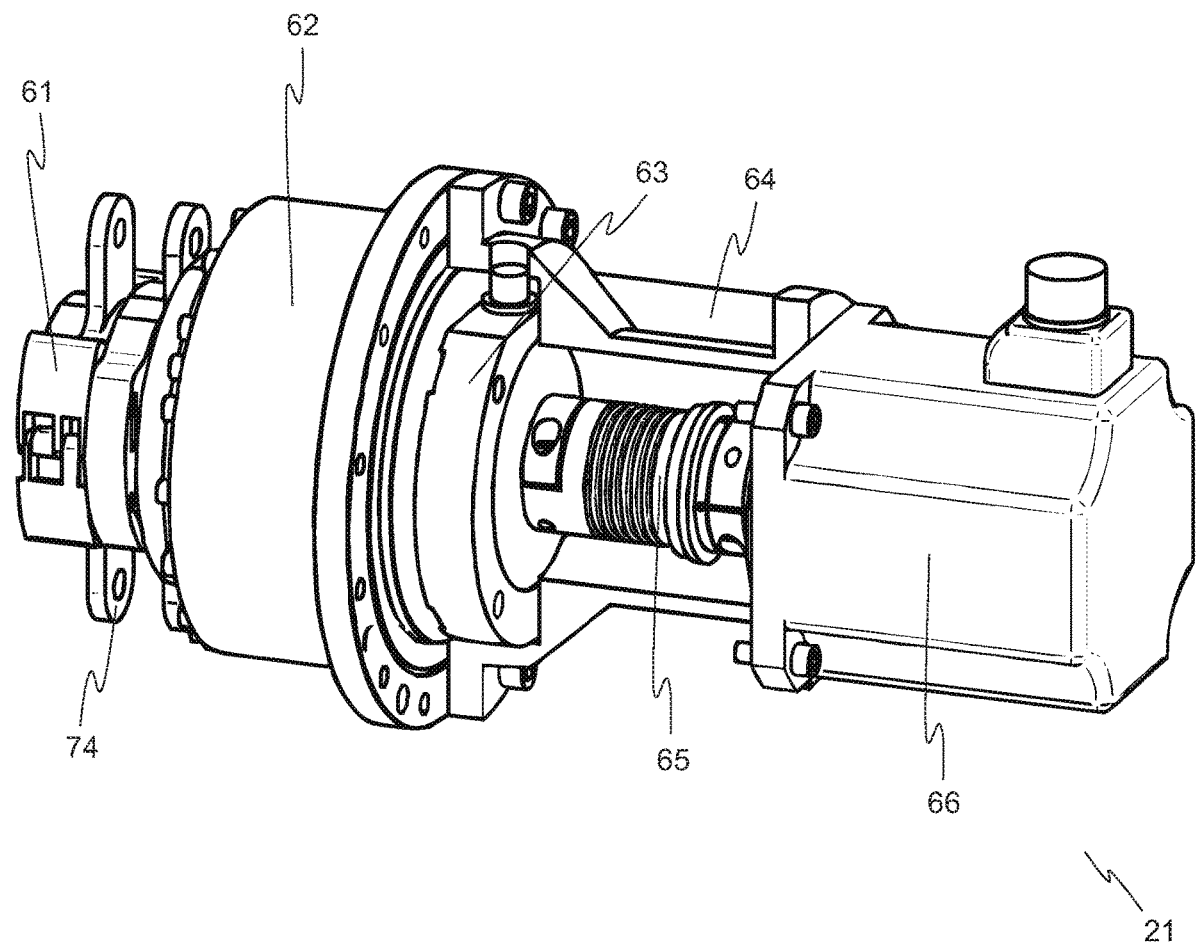
FIG. 6. Perspective view of a single line replaceable unit (LRU) with cutaway to show the torque limiting coupling.

Referring now to FIG. 6, servo motor 66 provides actuation power. Servo motor 66 may be any electric motor known in the art, but is preferably a brushless servo motor capable of operating under the tremendous centrifugal load of a spinning rotor, approximately 100 G at rotor speeds of 300 RPM. Preferably, the servo motor 66 provides to the transmission a continuous input torque of at least 10.5 N-m and a speed of at least 2,300 RPM at the continuous torque load.

Torque-limiting coupling 65 serves to protect the transmission and the rest of the electrically-driven actuator for a hard-over failure of the servo motor. The torque-limiting coupling transmits torques up to the stall torque of the motor but will release if torque approaches levels that would damage harmonic drive 62. This most likely happens when a malfunction causes the actuator 21 to run at full speed into a hard mechanical stop at either extreme of its range of motion. A torque-limiting coupling 65 also provides compliance for axle misalignment between the motor 66 and the transmission 62 while still maintaining high axial stiffness. Such misalignments could be caused by manufacturing tolerances or by deformation of the actuator 21 which may be caused by its own actuation force, centrifugal loads, and aerodynamic loading during operation. The torque-limiting coupling 65 is enclosed in coupling housing 64.

Most servo motor systems use an encoder or similar sensor on the drive shaft of the motor to provide feedback indicating the servo's position, thus closing the servo loop. External angular encoder 63, placed downstream of torque-limiting coupling 65, provides direct measurement of the transmission position and ultimately the angle of attack of the rotor blades 4. While an encoder is chosen for the illustrated embodiment, different embodiments may instead use Hall effect sensors or any other position sensor known in the art.

Encoder 63 connects directly to harmonic drive 62, which serves as the single-stage, zero-backlash transmission in the illustrated embodiment. In embodiments for applications of other sizes, other single-stage, zero-backlash transmissions may be preferable, such as cycloidal drives or wobble motors. Use of a hypercycloid transmission is also envisioned; hypercycloid transmissions are not zero-backlash but can be made to minimize backlash. Use of a multi-stage planetary gear transmission is also envisioned but is not preferable as such systems generally exhibit a comparatively large amount of backlash. The harmonic drive 62 is used in reduction gearing mode, meaning that the circular spline (not shown) is fixed, the wave generator (not shown) is rotatable and used as the input from the encoder 63, and the flexspline (not shown) is rotatable and used as the output. The transmission 62 steps down input rotation from the motor 66. The gear reduction ratio offered by the illustrated embodiment is about 160:1. Preferably, to reduce system cost, the harmonic drive is a commercially available part; more preferably, the harmonic drive is the CSG-58 transmission by Harmonic Drive LLC.

Figure 7A:
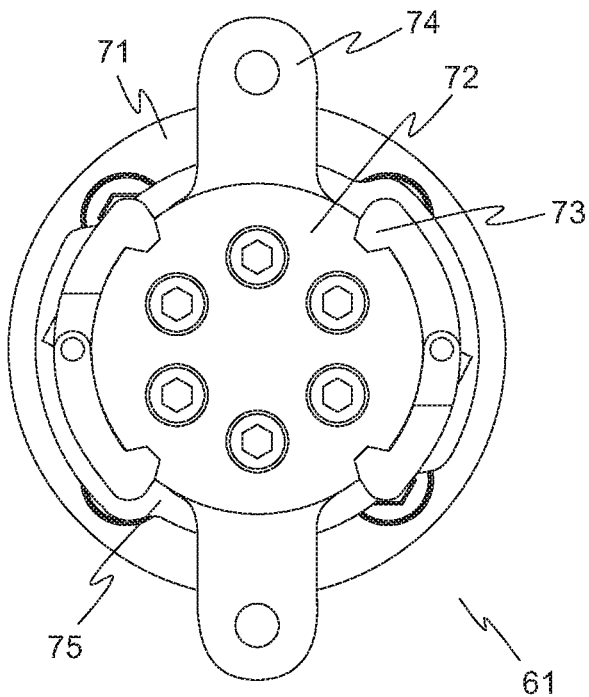
FIG. 7a. Plan view of a first embodiment of the decoupling mechanism (engaged).

Rotation output by the harmonic drive 62 is transmitted through decoupling mechanism 61, which is responsible for removal of a malfunctioning electrically-driven actuator 21 from the rest of the collective system, during operation of said system, in the event of a failure that renders the electrically-driven actuator 21 inoperative. FIG. 7a shows the decoupling mechanism 61 when it is engaged, with teeth 73 fitting into capping flange 72, which is bolted (or otherwise removably attached or fixed) to mounting flange 71, which is in turn bolted (or otherwise removably attached or fixed) to the flexspline (not shown) of the harmonic drive 62. Yokes 74 for attachment to the spherical rod end bearing 44 are connected to (or form one and the same solid piece with) collar 76 (visible only in FIG. 7c) that rides in a channel formed by the mounting flange 71 and the capping flange 72. During normal operation, when teeth 73 are engaged, the collar 76 is held fixed to the mounting flange 71 and capping flange 72, thus yokes 74 rotate to transmit motion from the harmonic drive 62 through to the rest of the collective system. Upon failure of actuator 21, a sensor system (not shown) comprising a control circuit (not shown) and power amplifier (not shown) detects the failure of the actuator 21, possibly by noting the output of encoder 63 or similar sensor.

On command from a controller (not shown), an actuation system can disengage the teeth 73 from the actuation ring 75 and the capping flange 72. With proper selection of material and geometry, this disengagement of the teeth 73 can be achieved while the LRU actuator is unloaded or loaded. The ability to disconnect while under load is critical to the overall system functionality. While it is observed that re-engagement of the actuator after disengagement is generally not preferable for reasons of reliability and simplicity of the decoupling system, it is also envisioned that proper choice of materials, geometry and configuration would permit re-engagement of a previously decoupled actuator during operation. This would be useful, for example, to return to service a functional actuator that was previously disengaged only because it was not performing optimally rather than because it had failed totally. Disengagement of the teeth can be accomplished through the use of several different actuators, solenoid and servo motors being desirable actuators.

Figure 7B:
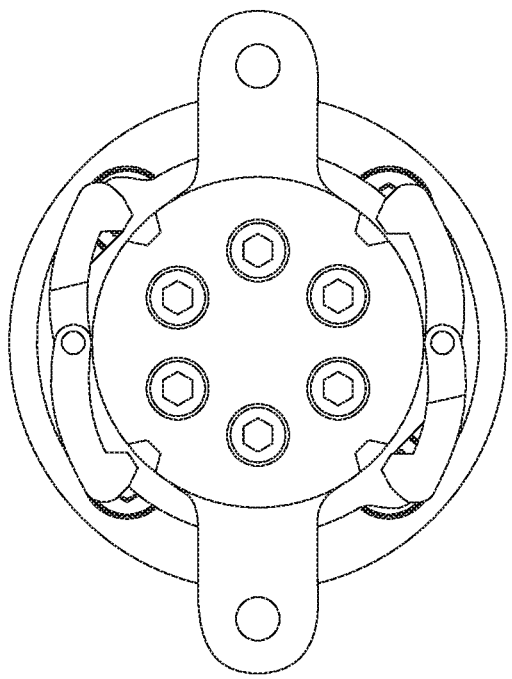
FIG. 7b. Plan view of a first embodiment of the decoupling mechanism (disengaged).
Figure 7C:
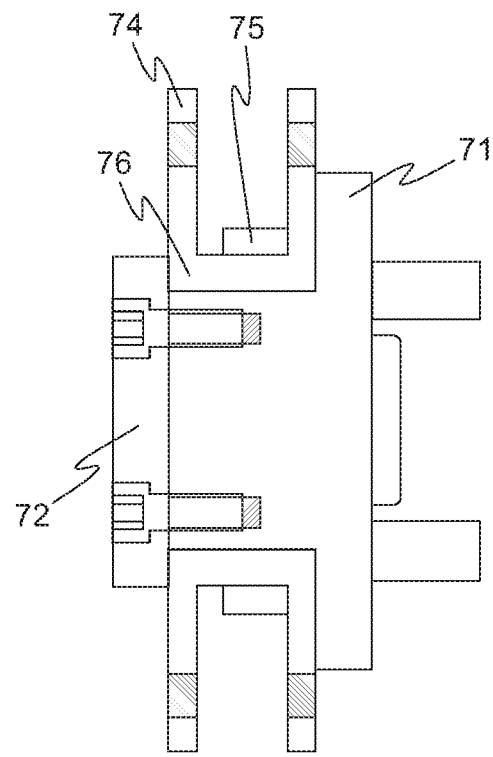
FIG. 7c. Cross-sectional side view of a first embodiment of the decoupling mechanism.
Figure 8A:
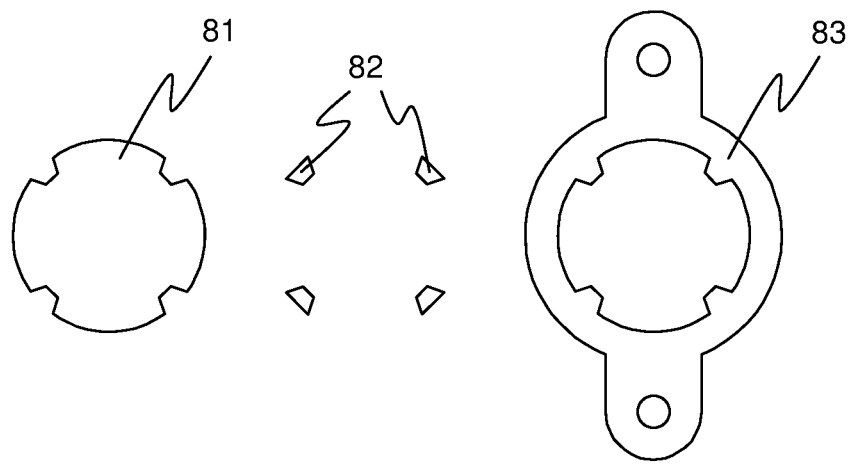
FIG. 8a. Simplified plan view of the separate components of a second embodiment of the decoupling mechanism.
Figures 8B, 8C, 8D:
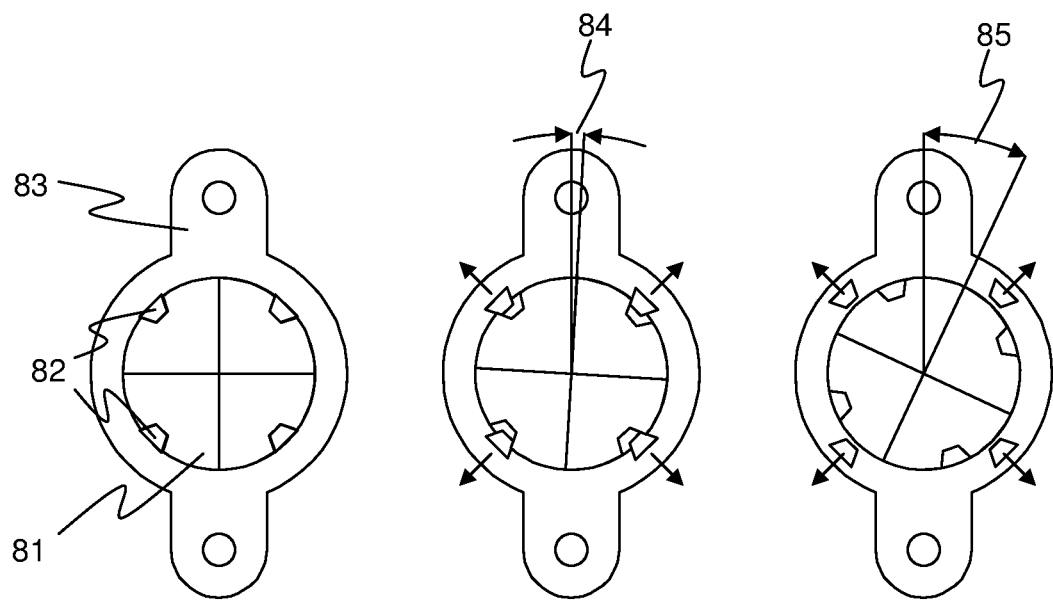
FIG. 8b. Simplified plan view of a second embodiment of the decoupling mechanism in full engagement.
FIG. 8c. Simplified plan view of a second embodiment of the decoupling mechanism in partial disconnection.
FIG. 8d. Simplified plan view of a second embodiment of the decoupling mechanism in full disconnection.
Figure 9A:
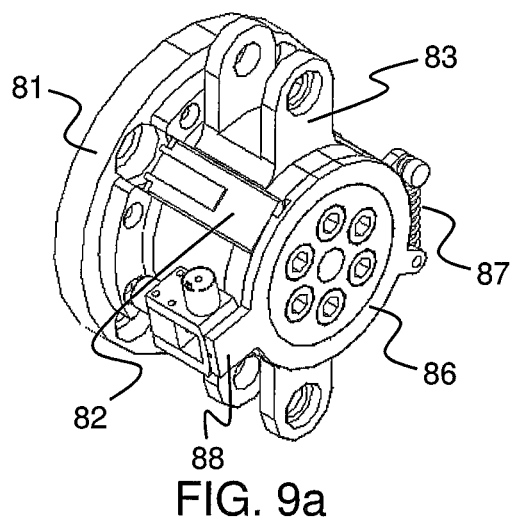
FIG. 9a. Perspective view of a second embodiment of the decoupling mechanism in full engagement.
Figure 9B:
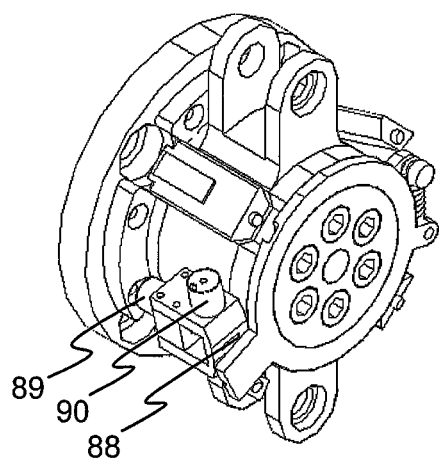
FIG. 9b. Perspective view of a second embodiment of the decoupling mechanism in partial disconnection.
Figure 9C:
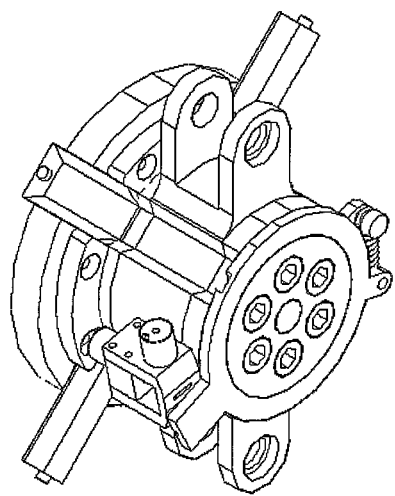
FIG. 9c. Perspective view of a second embodiment of the decoupling mechanism in full disconnection.
Figure 9D:
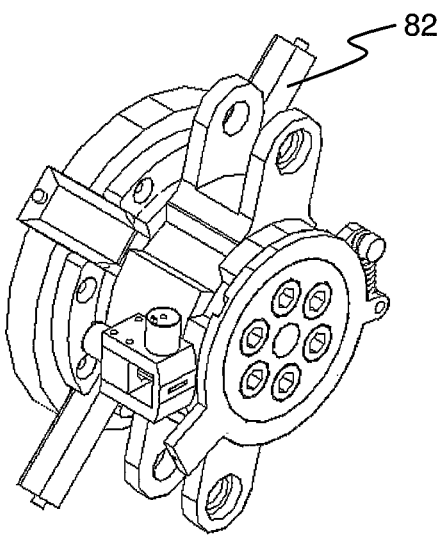
FIG. 9d. Perspective view of a second embodiment of the decoupling mechanism in full disconnection with the input and output rotated with respect to each other.
Figure 10A:
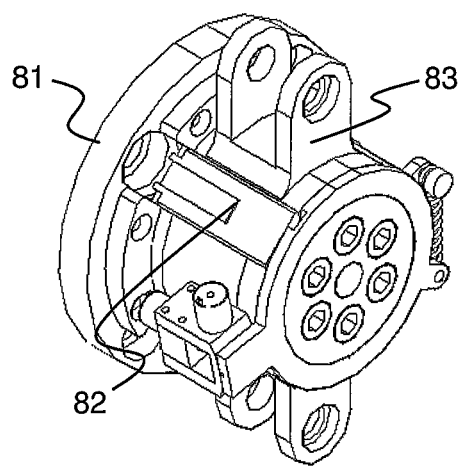
Figure 10B:
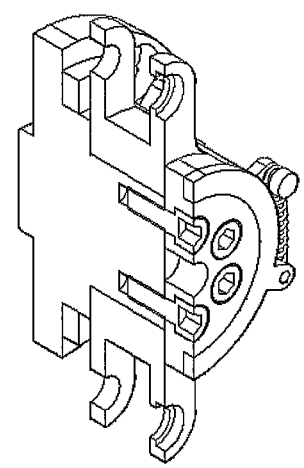
FIG. 10b. Cross-sectional perspective view of a second embodiment of the decoupling mechanism.
Figure 10C:
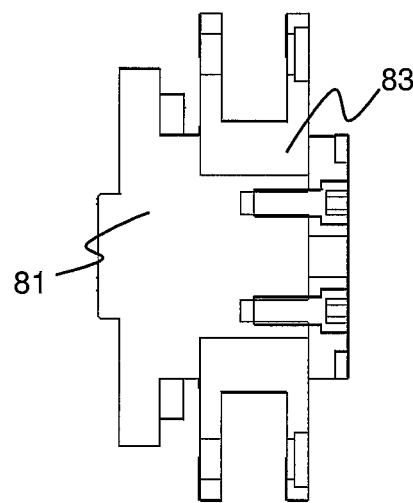
FIG. 10c. Cross-sectional side view of a second embodiment of the decoupling mechanism.
Figure 11A:
FIG. 11a. Cross-sectional side view of a second embodiment of the decoupling mechanism, with the section through output symmetry.
Figure 11B:
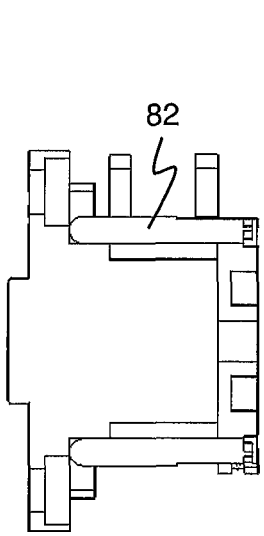
FIG. 11b. Cross-sectional side view of a second embodiment of the decoupling mechanism in full engagement, with the section through transfer elements.
Figure 11C:
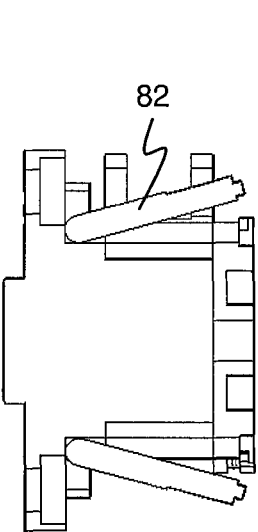
FIG. 11c. Cross-sectional side view of a second embodiment of the decoupling mechanism in partial disconnection, with the section through transfer elements.
Figure 11D:
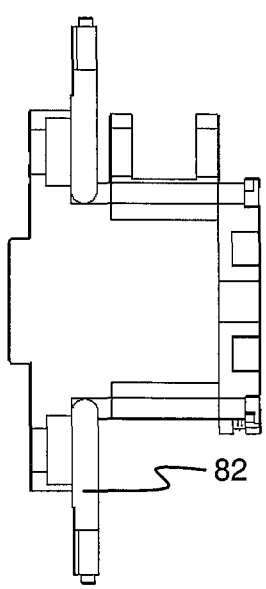
FIG. 11d. Cross-sectional side view of a second embodiment of the decoupling mechanism in full disconnection, with the section through transfer elements.

In one envisioned arrangement for the decoupling mechanism, two redundant linear solenoids (not shown) rotate slotted actuation ring 75, which lifts teeth 73 out of capping flange 72, as shown in FIG. 7b, and the collar turns freely on its axle formed by the flanges. The redundant linear solenoid actuators may work the decoupling mechanism 61 alone or combined, and advantageously may operate in continuous or pulse mode providing low power or high force options. The decoupling mechanism 61 thus serves both to reliably transmit torque from the harmonic drive 62 and to isolate a malfunctioning actuator 21 from the system, allowing the remaining functioning actuators 21 to provide reduced but adequate collective control of the rotorcraft.

In another envisioned arrangement, shown in FIGS. 8-12, the decoupling mechanism design uses a moving torque output 83 that is fixed to the input 81 by four trapezoidal cross-section transfer bars 82. During full engagement (FIG. 9a), the transfer bars are loaded at either end to reduce the shear stress in the bars. The bars are held in place by a retaining ring 86 at the proximal end of the LRU. A tension spring 87 connects the ring to the input elements 81 of the decoupling mechanism. A steel tab 88 prevents the retaining ring 86 from moving relative to the decoupling mechanism input. The steel tab 88 is connected to the armature (not shown) of the primary tubular solenoid (located in primary solenoid housing 89) that is spring loaded to hold the tab 88 into the retaining ring 86. Preventing the movement of the primary armature is the end of the secondary solenoid armature (not shown). Upon actuation of the secondary solenoid (located in secondary solenoid housing 90) by command from a controller (not shown), the primary solenoid is released and actuates pulling the steel tab 88 from its slot in the retaining ring 86. The tension spring 87 on the retaining ring 86 rotates the retaining ring 86. The proximal end of the transfer bars 82 are released from the retaining ring 86. Light springs (not shown) rotate the transfer bars from the distal end (as in FIG. 8c, FIG. 9b, and FIG. 11c). If the decoupling mechanism is under load, any small rotation of the input (angle 84) will permit the angled faces of the trapezoidal transfer bars 82 to push the bars 82 out of the trapezoidal slots in the input 81 and output 83 for full disconnection (as in FIG. 8d, FIG. 9c, and FIG. 11d). Once fully decoupled, the output is free to rotate to any angle 85 irrespective of the input (as shown in FIG. 8d and FIG. 9d).

Figure 12:
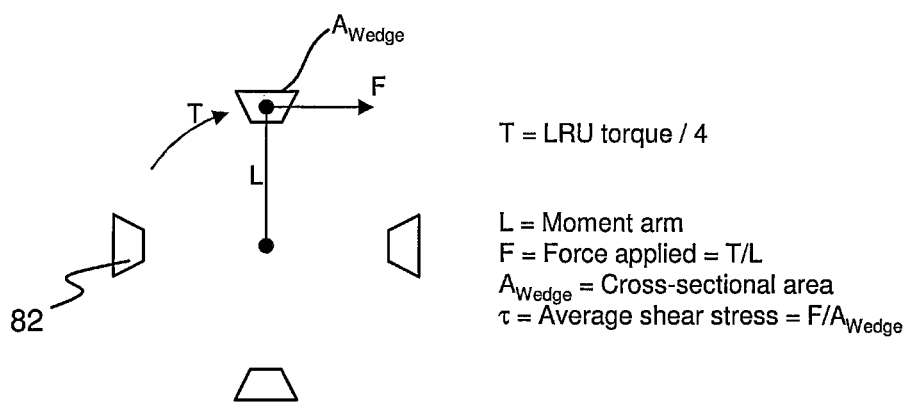
FIG. 12. Simplified plan view diagram of the engagement wedges of a second embodiment of the decoupling mechanism in full engagement.

FIG. 12 illustrates the relevant forces for four trapezoidal transfer bar wedges with the same cross-sectional area $A_{wedge}$. The torque T on any one transfer bar wedge is equal to one-quarter of torque supplied by the LRU. The moment arm L is the distance from the center of the circular arrangement of wedges to roughly the center of a wedge. The force F applied F then is equal to the torque T divided by the moment arm L. The average shear stress r is equal to the force F divided by the cross-sectional area $A_{wedge}$.

Referring back now to FIG. 3b and FIG. 4b, the yokes 74, 83 of the decoupling mechanism 61 are connected to actuator spherical rod end bearings 44, which are in turn connected to actuator unifying links 45 and then to actuator unifying bars 46. Actuator unifying bars 46 are connected to the upper unifying element 34 on the top and the lower unifying element 36 on the bottom. Each unifying element is a solid ring rotatably affixed around the rotor hub 20. Upper unifying element 34 and lower unifying element 36 turn in opposite directions with respect to each other.

Referring back now to FIG. 3a and FIG. 4a, blade root 22 is similarly attached to the unifying elements 34, 36 through a similar system of jointed mechanical links comprising blade root spherical rod end bearing 37, blade unifying link 38, which attaches to pitch shaft 39. Motion of the unifying elements 34, 36 is thus transmitted into pitch motion of the blade root 22.

Because all blade roots 22 are attached to the same unifying elements 34, 36, all blade roots are actuated at the same time and to the same angle of attack, providing collective control. Furthermore, because all actuators 21 are similarly attached to the same unifying elements 34, 36, the multiple actuators 21 provide redundancy to the system and any one or several actuators 21 can fail and be disconnected without causing a catastrophic failure that would result in the loss of the rotorcraft.

In the illustrated embodiment, the gear ratio between the actuation motors 66 and the blade root 22 angle of attack is approximately 1200:1. This number may vary for other embodiments and will depend principally on the characteristics of the electric motor used.

Repairs to the rotor head 2 caused by battle damage or environmental conditions may be streamlined by providing secure wiring connections with easily accessible wiring harnesses and accesses. Actuators 21 are provided as modular line replaceable units (LRUs) to permit for quick repair and replacement.

Access to the root 6 of each blade 4 is maintained inside the hub 20 with access to the hollow center of the main rotor shaft 3. Electrical, fluidic and/or mechanical connections can thus still be made internal to the rotor hub 20 with maintenance access provided from structurally integrated access doors.

The present invention addresses installation, maintenance, operational and performance challenges through a collective control system that replaces the swashplate and utilizes blade-root-actuated or on-blade control to achieve comprehensive swashplateless primary flight control. Techniques for individual blade control, or on-blade control, include, but are not limited to, blade flaps placed on the trailing edges or blade tips, blade slats placed on the leading edges, servoflap control, hinged control surfaces, torsionally deformable blades or blade segments that use active materials to twist the blades into new configurations, active suction or blowing, deployable flow control devices including microelectromechanical systems (MEMS), on-blade control surfaces (elevons), plasma actuators, adjustable camber airfoils, electro-hydraulic actuators, or simply additional motors placed in the rotating frame of the rotor hub to individually actuate the blades as described in U.S. Patent Application Publication 2009/0269199 A1, published on Oct. 29, 2009, which is herein incorporated by reference. Such individual control systems may be utilized to provide improved control, improved vibration reduction, and improved noise reduction. Typically, the on-blade control devices provide changes in the air loads in the rotating frame several times per revolution. Thus, the corresponding on-blade control actuation scheme must possess sufficiently high power density and fast actuation and be capable of operating under large centrifugal loads. For some on-blade actuation concepts, high power-density actuation mechanisms may be achieved through the utilization of active materials such as piezoelectrics and smart material actuation technologies which have the potential to overcome the size, weight and complexity issues of traditional on-blade actuation concepts such as hydraulic and electric actuation typically used for pitch, twist, and camber control. Further, a combination of on-blade actuation devices may produce greater performance or create a more practical solution to operate with the present invention. Many other on-blade control concepts may be utilized in conjunction with the present invention. These other devices may include a cabling to twist the blades or deflect flaps. The algorithmic control system described below may also be integrated with the control system of the system or systems for providing individual blade control, in order to provide comprehensive algorithmic control of the combined collective/individual rotorcraft blade control system.

Rotorcraft performance enhancements will be achieved by controlling these on-blade control devices at an appropriate frequency typically 2-10 times greater than the maximum rotor speed. Ideally, the on-blade control devices operate at least 4 to 5 times greater than the rotor speed. Effective on-blade control surfaces allow for higher blade loadings, as well as lower vibration which will reduce vibration, and increase the performance of the helicopter.

The user of the rotorcraft may be a human, piloting the rotorcraft from the cockpit or remotely from the ground or other location; or the user may be a command structure in the case that the rotorcraft is being piloted automatically, either individually or as part of a swarm or flock. Commands issued via the controls, either by a human pilot or an automated system, are preferably processed by a coordinated control system comprising one or more controllers to provide control signals to the rotor hub-mounted actuators 21 of the present invention.

Coordinated control between the redundant actuators 21 of the present invention is accomplished via communication between the actuators and one or more controllers, which may be located in a distributed fashion (e.g., a controller packaged with each actuator to reduce the chances of failed communication between actuator and controller) or centrally (e.g., controllers located elsewhere in the rotorcraft off the rotor hub to reduce as much as possible the weight of the rotating frame). Each actuator's sensor system, previously referred to, detects the performance of the actuator, and the output of this sensor system is preferably communicated to the one or more controllers; such communication may be wired or wireless or both, by any means known in the art, but preferably in such a way as to reduce weight and complexity while also providing for redundancy to reduce the chance of system failure. The controllers may comprise a digital electronic processor or processors, simple analog electronic control circuitry, or any combination thereof, or the control may be by any other means known in the art. Outputs from the controller(s) are preferably communicated (again, either wired or wirelessly) to inputs on the actuators or their power supplies to govern the amount of power each actuator supplies to the overall collective control system. Outputs from the controller(s) may also be communicated (again, either wired or wirelessly) to inputs on the decoupling mechanisms 61 to isolate or remove actuators from service entirely.

If the swashplate on a rotorcraft is replaced by multiple electrically-driven actuators to drive a common load, as in the present invention, then a coordinated control algorithm is preferably used to effectively control the root pitch angle. The algorithm is preferably designed such that each actuator works together to precisely position the load and compensate for any undesirable mechanical imperfections such as backlash. The control algorithm is preferably capable of maintaining the system's functional performance in the event that one or more actuators degrade in performance or fails completely.

The preferred coordinated control algorithm of the present invention comprises the overall control system architecture and the control system configuration. The control system architecture comprises the master-slave configuration of each actuator, multiple control loops for each actuator that can be configured as a master or a slave, routing the appropriate reference to the specific actuator, and the core control algorithm for precisely controlling the load while compensating for mechanical imperfections and unknown disturbances. The system configuration comprises setting up the overall system architecture by choosing the appropriate master, determining the actuators' ability to drive the given load, potentially scaling system gains based on performance metrics and actuator degradation, and scaling the reference commands to maximize the performance based on the available command authority.

With respect to the master-slave configuration of the preferred control system architecture, the control algorithm is designed such that one of the actuators functions as the master, while the remaining actuators function as the slaves, in order to minimize the negative interaction between the controllers. The slave actuators then follow the master actuator's lead, in a coordinated manner, and contribute their available energy to moving the load.

With respect to the multi-loop control architecture of the preferred control system architecture, each actuator has ability to function as the master at any given time. Therefore, each actuator has an identical control structure; however, at any given time a certain portion of the algorithm may be disabled. The multi-loop architecture comprises an inner control loop which is always, for both master and slave, configured to drive the force from the actuator, and an outer control loop which is configured to drive the root pitch angle to the desired rotation only for the master.

The generation and routing of the appropriate reference commands of the preferred control system architecture is dependent on which actuator is the functioning as the master and the ratio of the load and motor inertias. The reference for the master actuator orients the blades to the desired angle, while the reference for the slave actuators drives the force based on the master actuator to help accomplish the desired task. For this reason the multi-loop control architecture is important for minimizing phase lag between multiple actuators. The reference to the master actuator will be dependent on the desired angle of the blades and the transition profiles as defined by the operator and motors' capabilities.

With respect to the core algorithm of the preferred control system architecture, the control algorithm for each actuator is preferably designed to precisely track the desired reference signal, and provide robustness by compensating for unknown disturbances and mechanical imperfections. In general, the controller is robust to low frequency uncertainties; however, high frequency uncertainties may require special attention, such as utilizing high-order derivatives to compensate for specific features.

The system configuration of the preferred control system determines how the system is best configured, based on the system architecture, to precisely position the root angle of the rotor(s). Each of the system configuration tasks is in part based on a determination of how each actuator can aid in moving the specific load.

Many factors may affect an actuator's ability to translate energy to the given load, such as degradation or failures of electrical or mechanical components, failures in the mechanical linkages, or increased friction. The ability to identify how much of the force to rotate the load comes from a specific actuator is important in the system configuration as configured by the preferred control system. System performance identification is performed by monitoring movements in the root pitch angle and comparing the load inputs and outputs to determine each actuator's contribution to aiding the desired movements. Based on the system performance identification, the appropriate master actuator is reselected and the desired percentage of the total force output is defined for each actuator.

Maximizing the performance of the entire control system requires some of the control parameters and the reference profile to be modified when the actuators begin to significantly degrade or fail altogether. The control parameter most associated with an actuator failure is the high frequency gain of the system which is associated with the amount of load inertia associated with each motor. There are two methods for slowing down the reference profile, based on the complexity of the embedded system, which include modifying the actual profile or decreasing the effective bandwidth of each controller.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What we claim is:

1. An unmanned aerial vehicle (UAV) or rotorcraft comprising:
   at least one electrically-driven actuator comprising at least one electric motor;
   at least one rotor blade;
   at least one torque-limiting coupling;
   at least one zero-backlash transmission configured to communicate torque from the at least one electrically-driven actuator to the at least one rotor blade to change the at least one rotor blade's angle of attack with respect to a rotor head; and
   a mechanical disconnection mechanism configured for disconnecting at least one of the at least one electric motor, the at least one torque-limiting coupling, and/or the at least one zero-backlash transmission from the rotor head so as to not supply torque or friction.

2. The UAV or rotorcraft of claim 1, wherein the at least one zero-backlash transmission is a single-stage transmission selected from the group consisting of harmonic drive transmissions, cycloidal drive transmissions, or wobble drive transmissions.

3. The UAV or rotorcraft of claim 2, wherein the UAV or rotorcraft comprises at least 3 additional assemblies each comprising at least one electrically-driven actuator comprising at least one electric motor, at least one rotor blade, at least one torque-limiting coupling, and at least one zero-backlash transmission configured to communicate torque from the electrically-driven actuator to the at least one rotor blade.

4. The UAV or rotorcraft of claim 3, further comprising at least one encoder configured to indicate position of the at least one electric motor, the at least one torque-limiting coupling, and/or the at least one zero-backlash transmission.

5. The UAV or rotorcraft of claim 4, wherein each of the at least one electrically-driven actuators is adapted for adjusting the angle of attack of the at least one rotor blade.

6. The UAV or rotorcraft of claim 5, wherein at least two of the electrically-driven actuators are configured to be mounted to and rotate along with the rotor head, and each of the at least two actuators is individually capable of adjusting the angle of attack of all of the rotor blades on the rotor head.

7. The UAV or rotorcraft of claim 6, wherein each of the at least two electrically-driven actuators is equipped to be mechanically decoupled from the rotor head in the event that the actuator becomes disabled.

8. The UAV or rotorcraft of claim 6, wherein fewer than all of the at least two electrically-driven actuators are capable of adjusting the angle of attack of all blades attached to the rotor head.

9. An unmanned aerial vehicle (UAV) or rotorcraft comprising:
   at least one electrically-driven actuator comprising at least one electric motor;
   at least one rotor blade;
   at least one torque-limiting coupling;
   at least one mechanical transmission configured to communicate torque from the at least one electrically-driven actuator to the at least one rotor blade producing an angular displacement of the at least one rotor blade about the at least one rotor blade's longitudinal axis that is limited to an angular displacement range; and
   a mechanical disconnection mechanism configured for disconnecting at least one of the motor, coupling, and/or transmission from a rotor head so as to not supply torque or friction,
   wherein the at least one mechanical transmission has an amount of backlash that is less than 0.5% of the angular displacement range of the at least one rotor blade.

10. The UAV or rotorcraft of claim 9, wherein the UAV or rotorcraft comprises at least 3 additional assemblies each comprising at least one electrically-driven actuator comprising at least one electric motor, at least one rotor blade, at least one torque-limiting coupling, and at least one zero-backlash transmission configured to communicate torque from the electrically-driven actuator to the at least one rotor blade.

11. The UAV or rotorcraft of claim 10, wherein each of the actuators is configured to be mounted to and rotate along with the helicopter or rotorcraft rotor head.

12. The UAV or rotorcraft of claim 11, further comprising at least one encoder configured to indicate position of the at least one electric motor, the at least one torque-limiting coupling, and/or the at least one zero-backlash transmission.

13. The UAV or rotorcraft of claim 12, wherein each of the at least one electrically-driven actuators is adapted for adjusting the angle of attack of the at least one rotor blade.

14. The UAV or rotorcraft of claim 13, wherein each of the electrically-driven actuators is equipped to be mechanically decoupled from the rotor head in the event that the actuator becomes disabled.

15. An unmanned aerial vehicle (UAV) or rotorcraft comprising:
- at least one electrically-driven actuator comprising at least one electric motor,
- at least one rotor blade;
- at least one torque-limiting coupling,
- at least one zero-backlash transmission configured to communicate torque from the electrically-driven actuator to the at least one rotor blade to change the at least one rotor blade's angle of attack with respect to a rotor head; and
- a mechanical disconnection mechanism configured for disconnecting at least one of the motor, coupling, and/or transmission from the rotor head so as to not supply torque or friction,
- wherein the actuator is configured to be mounted to and rotate along with the helicopter or rotorcraft rotor head, and can be modularly replaced without the disconnection of any rotor blade from the rotor head.

16. The UAV or rotorcraft of claim 15, wherein the UAV or rotorcraft comprises at least 3 additional assemblies each comprising at least one electrically-driven actuator comprising at least one electric motor, at least one rotor blade, at least one torque-limiting coupling, and at least one zero-backlash transmission configured to communicate torque from the electrically-driven actuator to the at least one rotor blade.

17. The UAV or rotorcraft of claim 16, wherein the at least one zero-backlash transmission is a single-stage transmission selected from the group consisting of harmonic drive transmissions, cycloidal drive transmissions, or wobble drive transmissions.

18. The UAV or rotorcraft of claim 17, further comprising at least one encoder configured to indicate position of the at least one electric motor, the at least one torque-limiting coupling, and/or the at least one zero-backlash transmission.

19. The UAV or rotorcraft of claim 18, wherein each of the at least one electrically-driven actuators is adapted for adjusting the angle of attack of the at least one rotor blade.

20. The UAV or rotorcraft of claim 19, wherein at least two electrically-driven actuators are configured to be mounted to and rotate along with the rotor head, and each actuator is individually capable of adjusting the angle of attack of all of the rotor blades on the rotor head.

* * * * *